June 13, 1950            L. A. LOEB            2,511,117

ARTIFICIAL LURE

Filed April 23, 1945

Inventor

Lawrence A. Loeb

By Rockwell & Bartholow

Attorneys

Patented June 13, 1950

2,511,117

UNITED STATES PATENT OFFICE 2,511,117

ARTIFICIAL LURE

Lawrence A. Loeb, New Haven, Conn.

Application April 23, 1945, Serial No. 589,713

1 Claim. (Cl. 43—42.37)

This invention relates to artificial lures, and more particularly to such devices usually known as dry or wet fles, in that they are made to resemble the natural insects which are an important source of food to the fish.

Such lures commonly consist of a metal hook upon which is secured the parts of the fly (wet or dry), such, for example, as the wings, the body, the hackle and the tail, so that the finished device resembles one of the insects upon which the fish feed. These elements are usually secured to the metal hook by being tied thereon with silk thread, and the body is often wound so as to give the insect the appearance of having a somewhat translucent body and consequently appear as lifelike as possible.

The metal hook usually is carried entirely through the body and projects therefrom at the head of the insect where it is provided with an eye for tying to the leader. The other end of the hook is, of course, the bent end, having the usual point and barb. As the hook projects at both ends from the body and extends therethrough, it of course renders it impossible to make the body of the fly translucent, and renders it difficult to simulate translucency.

I contemplate in the present invention providing a fly or other lure, preferably of insect form, of such construction that it will have a translucent body and therefore more nearly resemble the insect which it is intended to imitate. To this end I form the body of the fly of a translucent plastic material, of a light color which can be the same as that of the insect itself. At the head of the body provision may be made for securing the lure to the line by making an opening through the plastic material, so that there will be no necessity for the projection of a metal eye or similar device for tying the line. Also the hook itself, or the bent end thereof, including the point and barb, may be formed of plastic material and formed integrally with the body so that it will be translucent and therefore scarcely able to be detected. To the translucent body the various elements of the insect may be secured, such as the wings, hackle and tail, and these elements may be secured in place by having their ends inserted in recesses or small openings in the plastic body, and thereafter cemented in place so that the laborious task of tying is eliminated, as well as the unnatural appearance of the thread.

A fly or lure constructed according to the principles of my invention may possess no metal parts whatever, and consist only of the translucent body and the various elements secured thereto to make it resemble the insect, so that there will be no opaque parts tending to detract from the simulation of the actual insect which it is desired to imitate.

One object of the present invention is to provide a new and improved fishing lure.

A further object of the invention is to provide a new and improved fishing lure having a translucent body portion to which may be secured the elements of an insect, such as legs, wings and tail, without detracting from the translucence of the body portion of the fly.

A still further object of the invention is to provide a new and improved fishing lure or fly, in which the entire body portion of the fly, including the hook, will be formed of translucent material, so as to more nearly simulate a natural insect and to obviate the use of metal parts which would detract from the appearance of the lure.

To these and other ends the invention consists in the novel features and combinations of parts to be hereinafter described and claimed.

Figure 1:
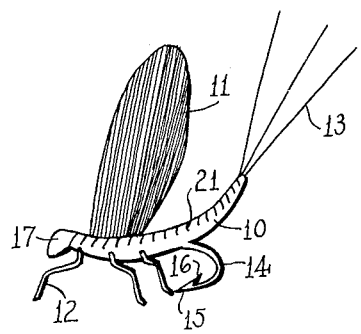
Fig. 1 is a side elevational view of a fishing lure embodying my invention, the lure as shown being in the form of a mayfly.
Figure 2:
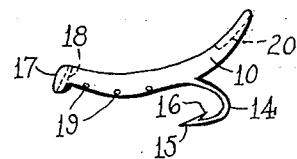
Fig. 2 is an elevational view of the body portion of the lure.
Figure 3:
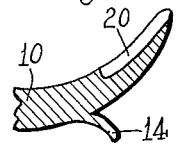
Fig. 3 is a fragmentary sectional view of the tail portion of the body shown in Fig. 2.

As illustrated in Figs. 1 to 3 of the drawings, the lure comprises a body portion 10 having wings 11, legs 12, and a tail 13. The body 10 is, according to the invention, made of a translucent plastic material, and integrally formed therewith is the hook 14 having the point 15 and barb 16.

The head 17 of the body portion may have an opening 18 formed therethrough by which the lure may be secured to the line. Also, the body portion may be provided with a plurality of small openings 19 into which the legs 12 may be inserted and secured by cement or lacquer. It will be understood that if a fly having a hackle is to be made, the hackle may be secured to the body in the usual manner of winding hackle.

Likewise, the tail members 13 may be secured to the body by having their ends lodged in openings or recesses formed therein and secured in place by a suitable cementitious material. As shown, the tail portion of the body 10 may be provided with a central recess or slot 20, opening through its upper side, in which the ends of the members 13 may be inserted, so that a firm connection will be made between these members and the body of the fly. The wings 11 may be secured to the body with a suitable glue or shellac or their lower ends may be inserted into a recess similarly to the tail members 13. Also, if desired, the body may be provided with suitable markings 21, so as to more exactly simulate the appearance of the natural insect.

It will be seen that I have provided a lure or fly with a wholly translucent body without the interposition therein of any opaque substance such as would be the case if the shank of a metal hook extended through the body, as is usually the case. In the form of my invention above described, the hook is also formed of translucent material and formed integrally with the body.

Figure 4:
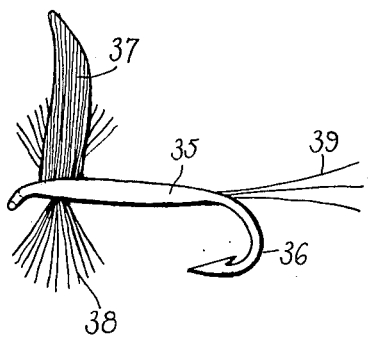
Fig. 4 is a side elevational view of a lure which is in the form of a typical dry fly.

In Fig. 4 of the drawings I have shown a lure in the form of a typical dry fly. In this case, the body portion 35 is of plastic material, and the hook 36 is integrally formed therewith and is also of translucent plastic material. The wings 37 and hackle 38 may be tied to the body portion in the manner usually employed in dressing artificial flies. The tail members 39 may be secured to the translucent body 35 by using cement or lacquer.

It will be seen that I have provided a method of making a lure, in the form of two of the well-known types of flies, which may be provided with a genuinely translucent body, so that it will more nearly resemble the natural insect which it simulates than those which are opaque and possess only a translucent or iridescent appearance due to the winding on the shank of the hook.

While I have shown and described some preferred embodiments of my invention, it will be understood that it is not to be limited to all of the details shown, but is capable of modification and variation within the spirit of the invention and within the scope of the claim.

What I claim is:

A fishing lure in imitation of an insect or the like, said lure having a body portion wholly formed of translucent plastic material, and a hook structurally integral with said body, the hook and body constituting a single piece.

LAWRENCE A. LOEB.

REFERENCES CITED

The following references are of record in the file of this patent:

UNITED STATES PATENTS

| Number | Name | Date |
|---|---|---|
| 1,177,281 | Schweickert | Mar. 28, 1916 |
| 1,611,635 | Dills | Dec. 21, 1926 |
| 1,975,218 | Worden | Oct. 2, 1934 |
| 2,007,045 | Francis | July 2, 1935 |
| 2,123,951 | McArthur | July 19, 1938 |
| 2,165,734 | Stracener | July 11, 1939 |
| 2,224,389 | Haselwood | Dec. 10, 1940 |
| 2,345,197 | Hirsch et al. | Mar. 28, 1944 |
| 2,370,391 | Bolten et al. | Feb. 27, 1945 |

FOREIGN PATENTS

| Number | Country | Date |
|---|---|---|
| 19,148 | Great Britain | Nov. 5, 1891 |